United States Patent [19]

Yano

[11] 4,282,561
[45] Aug. 4, 1981

[54] AUTOMOBILE HEADLIGHT LIGHTING APPARATUS

[75] Inventor: Haruto Yano, Hiroshima, Japan

[73] Assignee: Toyo Kogyo Co., Ltd., Hiroshima, Japan

[21] Appl. No.: 16,612

[22] Filed: Mar. 1, 1979

[30] Foreign Application Priority Data

Mar. 7, 1978 [JP] Japan ............................. 53-29153[U]

[51] Int. Cl.³ ............................................ B60Q 1/06
[52] U.S. Cl. ..................................................... 362/65
[58] Field of Search ................................... 362/65–66, 362/269, 272, 277, 282, 285–289; 315/82–83; 307/10 LS

[56] References Cited

U.S. PATENT DOCUMENTS 2,795,772  6/1957  Habsburg-Lothringer et al. ... 362/65 X
3,361,901  1/1968  Mesler et al. .......................... 362/65

FOREIGN PATENT DOCUMENTS 837610  9/1956  United Kingdom ....................... 362/65

Primary Examiner—L. T. Hix
Assistant Examiner—Thomas H. Tarcza
Attorney, Agent, or Firm—Wenderoth, Lind & Ponack

[57] ABSTRACT

An automobile headlight lighting apparatus which has a light unit, including a headlight lamp, adapted to be selectively concealed and exposed relative to a light chamber, and further has a light switch for energizing the headlight lamp with electric power supplied thereto. The apparatus further has a drive unit operable to cause the light unit to be selectively concealed and exposed. The drive unit is operated in response to the switching on of the light switch. For enabling the drive unit to be operated independently of the light switch, an additional electric circuit is provided for operating the drive unit to cause the light unit to be selectively concealed and exposed.

10 Claims, 5 Drawing Figures

Fig. 3
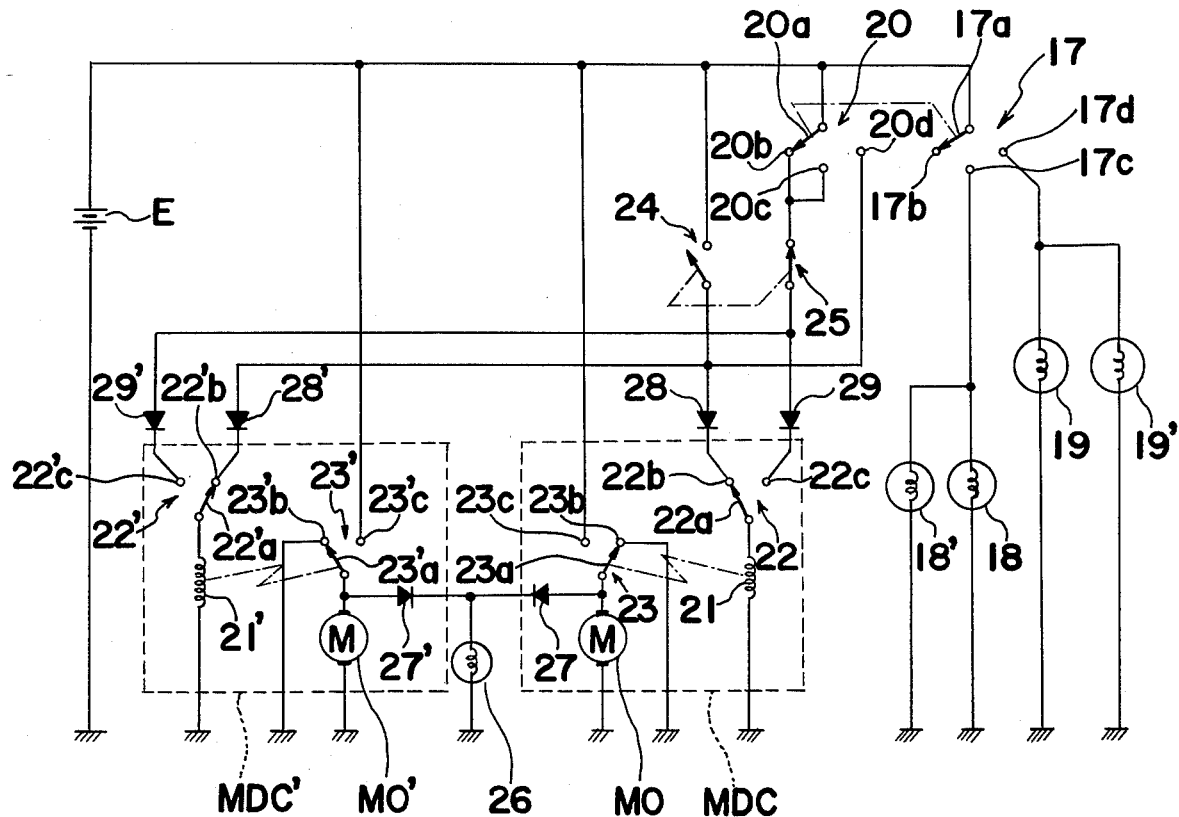
Fig. 4(a)  Fig. 4(b)  Fig. 4(c)
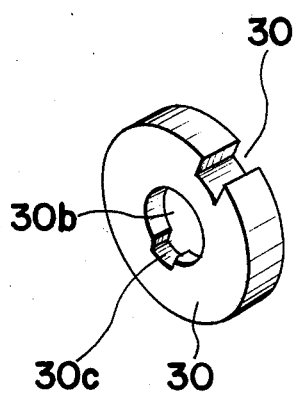
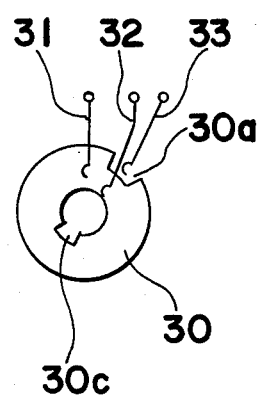
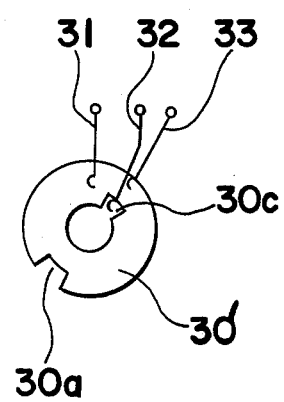

AUTOMOBILE HEADLIGHT LIGHTING APPARATUS

BACKGROUND OF THE INVENTION

The present invention generally relates to an electric lighting circuit and, more particularly, to a headlight lighting circuit for an automobile having at least one headlight of a type capable of being selectively exposed and concealed when the headlight is turned on and off, respectively.

Automobile headlights of a type capable of being selectively exposed and concealed when the headlights are turned on and off, respectively, which headlights will be hereinafter referred to as "concealable headlights", are currently employed in fairly recently developed fascinating models of automobile. In general, the concealable headlights now in use can possibly be classified into two types, namely, cover-up type and retractable type, depending upon how the headlight is concealed. The cover-up type is the one wherein the headlight, fixed in position in the front end of the body of the automobile, is concealed by a pivotally supported or foldable cover plate when the latter is moved to a closed position to cover the headlight whereas the retractable type is the one wherein the headlight is concealed or retracted into a lamp room in the front end of the automobile body.

In both types, the movement of the cover plate or the headlight selectively between exposed and concealed positions is effected by an electric motor operatively coupled thereto by means of a link mechanism. A conventional electric circuit for this drive motor includes a motor switch so ganged together with a headlight switch for the headlight that the switching on and off of the headlight switch to turn the headlight on and off can result in the movement of the cover plate or the headlight from the concealed position towards the exposed position and from the exposed position towards the concealed position, respectively.

The conventional circuit arrangement wherein the motor switch and the headlight switch are ganged together as hereinbefore described is very convenient in that there is no possibility that an automobile driver, after having turned one of the motor and headlight switches on, fails to turn the other of the motor and headlight switches on and vice versa. In other words, no separate manipulation of the motor and headlight switches is required.

While the conventional circuit arrangement has such an advantage in particular situations, it suffers from certain disadvantages which impair its utility in actual automobiles. By way of example, where the cover plate or the headlight is required to be held in the exposed position for the purpose of, for example, cleaning of the car or prevention of freezing of the cover plate in the concealed position, the headlight is simultaneously turned on even in those cases where no light is required.

In view of the above, it has long been considered desirable if the electric circuit is so designed as to enable the motor switch to be manipulatable independently of the headlight switch so that the cover plate or the headlight can be brought to the exposed position without the headlight being turned on and, simultaneously therewith, to enable the cover plate or the headlight to be brought to the exposed position when the headlight switch is turned on.

SUMMARY OF THE INVENTION

Accordingly, the present invention has for its essential object to provide an improved electric lighting circuit for the concealable headlight for an automobile, which is effective not only to enable the cover plate or the headlight to be brought to the exposed position without the headlight being turned on, but also to enable the switching on of the headlight to result in the movement of the cover plate or the headlight to the exposed position.

Another object of the present invention is to provide an improved lighting circuit of the type referred to above, which is applicable to any one of the cover-up and retractable types of headlight without requiring any complicated wiring system.

A further object of the present invention is to provide an improved lighting circuit of the type referred to above, wherein there is no interference in operation between a circuit component for driving the cover plate or the headlight and a circuit component for lighting the headlight.

A still further object of the present invention is to provide an improved lighting circuit of the type referred to above, which can be manufactured with a minimum number of component parts and is reliable in operation.

According to the present invention, it is possible to keep the cover plate or the headlight in the exposed position irrespective of whether or not the headlight is turned on. This is particularly advantageous in avoiding the possibility that the cover plate or the headlight which has been held in the concealed position may fail to move to the exposed position by some reason, for example, by the freezing of the cover plate or the headlight to the automobile body or by the jamming of a foreign matter into a path of movement of the cover plate or the headlight. Moreover, replacement of a broken lamp element with a fresh one can readily be carried out without the electric circuit for the headlight lamp kept energized.

BRIEF DESCRIPTION OF THE DRAWINGS

These and other objects and features of the present invention will become apparent from the following description taken in conjunction with preferred embodiments thereof with reference to the accompanying drawings, in which:

FIG. 3 is a diagram similar to FIG. 2, showing another preferred embodiment of the present invention;

FIG. 4(a) is a schematic perspective view of a switch element employable in any one of the circuits of FIGS. 2 and 3; and FIGS. 4(a) and 4(b) and 4(c) are schematic end views of the switch element of FIG. 4(a) shown in different operative positions, respectively.

DETAILED DESCRIPTION OF THE INVENTION

Figure 1:
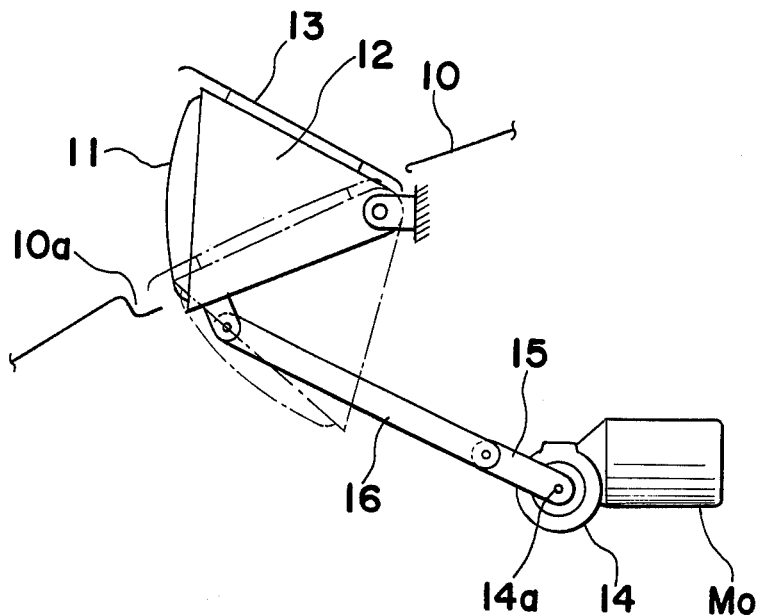
FIG. 1 is a schematic side elevational view of a concealable headlight assembly of a retractable type shown with a drive unit.

Before the description of the present invention proceeds, it is to be noted that like parts are designated by like reference numerals throughout the accompanying drawings. It is also to be noted that, although the concept of the present invention is equally applicable to the concealable headlight of cover-up type, the retractable type will be described for the purpose of illustration of the present invention.

Referring first to FIG. 1, an automobile body 10, schematically shown by 10a, has at least one opening 10a defined therein and through which a concealable headlight 11 can be selectively concealed and exposed. This concealable headlight 11 comprises a substantially conical lamp housing 12 having an apex portion connected to a portion of the automobile body 10 for pivotal movement between an exposed position, shown by the solid line, and a retracted position shown by the chain line, it being to be understood that, when the lamp housing 12 is in the exposed position, the headlight 11 is exposed outside the automobile body 10 and, when the lamp housing is in the retracted position, the headlight 11 is concealed within the automobile body 10. A cover plate 13 is rigidly mounted on the lamp housing 12 for pivotal movement together with the lamp housing 12 and serves to close the opening 10a when the lamp housing 12 is held in the retracted position.

For effecting the pivotal movement of the lamp housing 12 in the manner described above, either the lamp housing 12 or the cover plate 13, for example, the lamp housing 12 so far illustrated, is operatively coupled to an electric motor Mo through a transmission system. The transmission system includes a reduction gear unit 14 of any known construction, which may be rigidly mounted on a housing for the motor Mo and which has an output shaft 14a rotatable at a reduced speed with respect to the speed of rotation of the motor Mo, a crank arm 15 rigidly mounted on the output shaft 14a of the reduction gear unit 14 for rotation together with the shaft 14a, and a connecting link 16 having one end rotatably connected to the crank arm 15 and the other end pivotally connected to the lamp housing 12.

So far illustrated, the transmission system is so designed that one complete rotation of the crank arm 15 together with the output shaft 14a of the reduction gear unit 14 can result in a reciprocal movement of the lamp housing 12 between the exposed and retracted positions. However, any other suitable transmission system known to those skilled in the art may be employed in the present invention.

It is to be noted that, although in FIG. 1 the lamp housing 12 has been shown and described as pivotally connected to the automobile body 10, such an alternative is possible that the cover plate 13 be pivotally connected to the automobile body 10 while the lamp housing 12 is supported by the cover plate 13.

Figure 2:
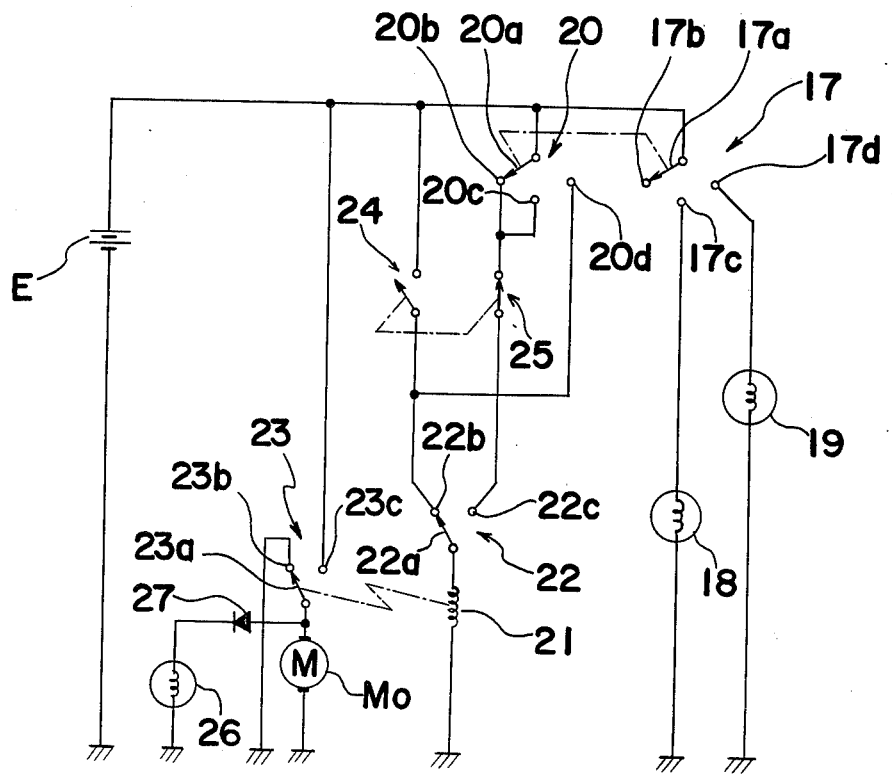
FIG. 2 is a circuit diagram of a headlight lighting system according to one preferred embodiment of the present invention.

The motor Mo is, according to the present invention, electrically associated with a switch for the headlight 11 in the manner which will now be described with reference to FIGS. 2 and 3 showing respective embodiments of the present invention.

Referring now to FIG. 2, the automobile lighting circuit shown therein comprises a light switch 17 of a type having a movable contact 17a, electrically connected to a battery power source E, and first, second and third fixed contacts 17b, 17c and 17d. While the movable contact 17a is engaged to the first fixed contact 17b when the light switch 17 is turned off, the second and third fixed contacts 17c and 17d are electrically connected to the ground respectively through an auxiliary lamp 18 and a headlight lamp 19. The auxiliary lamp 18 may be a fog lamp or any other warning lamp well known to those skilled in the art whereas the headlight lamp 19 is housed within the lamp housing 12 and is of any known construction.

Operatively associated with the light switch 17 is a slave switch 20 of a type having a movable contact 20a electrically connected to the battery power source E, and first, second and third fixed contacts 20b, 20c and 20d. The movable contact 20a of the slave switch 20 is so manipulatable so movable together with the movable contact 17a of the light switch 17 as to engage the first to third fixed contacts 20b, 20c and 20d one at a time when the movable contact 17a of the light switch 17 is engaged to the first to third fixed contacts 17b, 17c and 17d, respectively.

The lighting circuit further comprises a motor drive circuit including a relay coil 21 having one end connected to a selector switch 22 and the other end grounded, and a relay switch 23 having a movable contact 23a, grounded through the motor Mo, and a pair of fixed contacts 23b and 23c respectively connected to the ground and the battery power source E. The relay switch 23 is of a type having its movable contact 23a normally biased to engage the first fixed contact 23b when and so long as the relay coil 21 is deenergized, but engageable to the second fixed contact 23c when the relay coil 21 is energized.

The selector switch 22, which may be a limit switch, has a movable contact 22a, electrically connected to the relay coil 21, and first and second fixed contacts 22b and 22c which are respectively connected through a first manipulatable switch 24 to the power source E and through a second manipulatable switch 25 to both of the first and second fixed contacts 20b and 20c of the slave switch 20, said first and second manipulatable switches being so operatively associated with each other that the switching off of one of the first and second manipulatable switches 24 and 25 can results in switching on of the other of the first and second manipulatable switches 24 and 25. The selector switch 22 is so designed that the movable contact 22a is engaged to the first fixed contact 22b when the lamp housing 12 is held in the retracted position as shown by the chain line in FIG. 1 and to the second fixed contact 22c when the same lamp housing 12 is held in the exposed position as shown by the solid line in FIG. 1. For this purpose, the movable contact 22a of the selector switch 22 is responsive to a parameter representative of the movement of the lamp housing 12 between the exposed and retracted positions in such a manner that it can be engaged to the first fixed contact 22b in response to or upon arrivabl of the lamp housing 12 at the retracted position and to the second fixed contact 22c in response to or upon arrival of the lamp housing 12 at the exposed position.

In one form of the selector switch 22, a switch assembly of a construction shown in FIGS. 4(a) to 4(c) may be employed, which will now be described.

The switch assembly comprises a rotor 30, rigidly mounted on, or otherwise supported in position in any suitable manner for rotation at a speed equal to the speed of rotation of, the output shaft 14a of the reduction gear unit 14, and first, second and third contact brushes 31, 32 and 33. The rotor 30 is made of an electroconductive material and has a first cutout 30a defined on a portion of the peripheral face thereof and a central recess 30b defined therein in coaxial relation to the axis of rotation of the rotor 30, said recess 30b being communicated to a second cutout 30c which extends radially outwardly from the wall defining the recess 30b. In this construction, the first contact brush 31 is always engaged to an annular face of the rotor 30 by the effect of its own resiliency and, therefore, constitutes the movable contact 22a of the selector switch 22 together with the rotor 30, while the contact brushes 32 and 33 constitute the respective first and second fixed contacts 22b and 22c of the selector switch 22.

When the switch assembly of the construction shown in FIGS. 4(a) to 4(c) is practically employed, it will readily be understood that the contact brush 32 is electrically connected to the contact brush 31 through the rotor 30 with the tip of the contact brush 33 accommodated within the cutout 30a is electrically insulated relation to the rotor 30, as best shown in FIG. 4(b) when the lamp housing 12 is held in the retracted position while, when the lamp housing 12 is held in the exposed position, the contact brush 33 is electrically connected to the contact brush 31 through the rotor 30 with the tip of the contact brush 32 accommodated within the cutout 30c in electrically insulated relation to the rotor 30 as best shown in FIG. 4(c). However, during the movement of the lamp housing 12 from the retracted position towards the exposed position or from the exposed position towards the retracted position, all of the contact brushes 31 to 33 are electrically connected to each other and this does not involve any problem in practical application as will readily be understood from the subsequent description. It is to be noted that, although the rotor 30 has been described as made of an electroconductive material, it may be made of any electrically insulating material provided that an electroconductive coating be appied to the annular face of the rotor 30.

Referring back to FIG. 2, for the purpose of indicating an operating condition of the motor Mo to an automobile driver, an indicator lamp 26 is employed. This indicator lamp 26 is electrically connected to the movable contact 23a of the relay switch 23 through a diode 27 so that, during the rotation of the motor Mo resulting from the engagement of the movable contact 23a to the second fixed contact 23c as will be described later, the indicator lamp 26 can be turned on to show that the motor Mo is in operation, that is, the lamp housing 12 is being moved from the exposed position towards the retracted position or from the retracted position towards the exposed position.

The lighting circuit of the construction described above with particular reference to FIG. 2 operates in the following manner.

Under the condition as shown in FIG. 2 wherein the movable contacts 17a and 20a of the associated switches 17 and 20 are respectively engaged to the first fixed contacts 17b and 20b and the first and second manipulatable switches 24 and 25 are respectively turned off and on, the lamp housing 12 is held in the retracted position as shown by the chain line in FIG. 1 and the movable contact 22a of the selector switch 22 is engaged to the first fixed contact 22b.

Starting from the condition shown in FIG. 2, assuming that the movable contact 17a of the light switch 17 is engaged to the third fixed contact 17d to energize the headlight lamp 19 after having moved past the position of the second fixed contact 17c, the movable contact 20a of the slave switch 20 is also engaged to the third fixed contact 20d. Upon engagement of the movable contact 20a to the third fixed contact 20d, an electric current flows from the power source E to the ground through the slave switch 20, then through the selector switch 22 and finally through the relay coil 21 thereby energizing the relay coil 21. The energization of the relay coil 21 results in engagement of the movable contact 23a to the second fixed contact 23c of the relay switch 23 and, therefore, the motor Mo is supplied with an electric power from the power source E through the relay switch 23.

When the motor Mo is energized in the manner described above, the lamp housing 12 is moved from the retracted positon towards the exposed position with the headlight lamp 19 within the lamp housing 12 being turned on. Simultaneously with the rotation of the motor Mo, the indicator lamp 26 is turned on to show to the automobile driver that the motor Mo is in operation.

Subsequent arrival of the lamp housing 12 at the exposed position causes the movable contact 22a of the selector switch 22 to engage the second fixed contact 22c, thereby interrupting the supply of the electric power through the relay coil 21. Accordingly, the relay coil 21 is deenergized and the movable contact 23a of the relay switch 23 is engaged to the first fixed contact 23b to connect the motor Mo to the ground through the relay switch 23, the consequence of which is that the motor Mo is braked by the dynamic braking effect with the lamp housing 12 held in the exposed position.

When the movable contact 17a of the light switch 17, which has been engaged to the third fixed contact 17d, is subsequently engaged to the second fixed contact 17c or the first fixed contact 17c, the movable contact 20a of the slave switch 20 is also engaged to the second fixed contact 20c or the first fixed contact 20b, repectively. Whenever the movable contact 20a of the slave switch 20 is engaged to the second fixed contact 20c or the first fixed contact 20b, the electric power from the power source E can be supplied to the selector switch 22 through the slave switch 20 because the first and second fixed contacts 20b and 20c are connected to each other. In this condition, since the second manipulatable switch 25 is switched on, the electric current from the power source E flows through the relay coil 21 through the second manipulatable switch 25 and then through the selector switch 22 having its movable contact 22a then engaged to the second fixed contact 22c. Accordingly, the movable contact 23a of the relay switch 23 is again engaged to the second fixed contact 23c to enable the motor Mo to rotate to complete the latter half of 360° rotation. Consequently, the lamp housing 12 in the exposed position is returned back towards the retracted position with the headlight lamp 19 within the lamp housing 12 turned off. The arrival of the lamp housing 12 at the retracted position causes the movable contact 22a of the selector switch 22 to engage the first fixed contact 22b and, therefore, the relay coil 21 is deenergized with the movable contact 23a of the relay switch 23 consequently engaged to the first fixed contact 23b. As is the case with the movement of the lamp housing 12 from the retracted position to the exposed position, the engagement of the movable contact 23a of the relay switch 23 to the first fixed contact 23b results in electrical connection of the motor Mo to the ground and, therefore, the motor Mo is braked by the dynamic braking effect to halt the lamp housing 12 at the retracted position.

Where the lamp housing 12 held, for example, in the retracted position is desired to be moved to the exposed position independently of the switching on and off of the headlight lamp 19, what is necessary is to turn the first manipulatable switch 24 on. The switching on of the first manipulatable switch 24 results in switching off of the second manipulatable switch 25 on one hand and the electric current is supplied from the power source E to the relay coil 21 through the first manipulatable switch 24 and then through the selector switch 22 having its movable contact 22a engaged to the first fixed contact 22b. Therefore, the motor Mo is rotated to move the lamp housing 12 from the retracted position towards the exposed position in a similar manner as is the case with the supply of the electric current to the relay coil 21 through the slave switch 20.

However, the return of the lamp housing 12 from the exposed position back to the retracted position can be effected by switching the first and second manipulatable switches 24 and 25 off and on, respectively, only when the movable contact 20a of the slave switch 20 is engaged any one of the first and second fixed contacts 20b and 20c. In any event, the first and second manipulatable switches 24 and 25 are inoperative when the headlight lamp 19 is turned on, that is, the movable contacts 17a and 20a of the associated switches 17 and 20 are respectively engaged to the third fixed contacts 17d and 20d.

Where the switch assembly of the construction shown in and described with reference to FIGS. 4(a) to 4(b) is employed for the selector switch 22, it will readily be seen that, during the first half of one complete rotation of the motor Mo in which the lamp housing 12 is moved from the retracted position towards the exposed position, the contact brush 31 is kept in electrical contact with the contact brush 32 through the rotor 30 being rotated and, during the latter half of the complete rotation of the motor Mo in which the lamp housing 12 is moved from the exposed position towards the retracted position, the contact brush 31 is kept in electrical contact with the contact brush 33 through the same rotor 30 being rotated. In practice, during the electrical connection achieved between the contact brushes 31 and 32 through the rotor 30 being rotated, the contact brush 33 is also electrically connected to any one of the contact brushes 31 and 32 through the rotor 30, but no electric power is supplied to the contact brush 33. Similarly, during the electrical connection achieved between the contact brushes 31 and 33 through the rotor 30 being rotated, the contact brush 32 is also electrically connected to any one of the contact brushes 31 and 33 through the rotor 30, but no electric power is supplied to the contact brush 32.

In the foregoing description, one motor Mo has been described as used for moving one lamp housing 12 between the retracted and exposed position. However, the number of the lamp housings to be moved by one motor may not be limited to one such as shown, but may be two or more, in which case a more complicated transmission system as compared with that shown in FIG. 1 will be required. Alternatively, a plurality of motors one for each lamp housing may be employed, the example of which is shown in FIG. 3.

Referring now to FIG. 3, the circuit shown therein is advantageously employable in most automobiles having left-hand and right-hand headlights spaced apart from each other with an engine room positioned therebetween. In the circuit shown in FIG. 3, since an additional motor drive circuit identical in construction with the motor drive circuit which has been described as including the relay coil 21 and its associated relay switch 23, the selector switch 22 and the motor Mo, is employed in association with an additional headlight lamp 19' and is electrically connected in parallel to the motor drive circuit shown and described with reference to FIG. 2, the operation of the circuit shown in FIG. 3 is believed to be self-explanatory and can readily be understood by those skilled in the art. It is, however, to be noted that like components of the additional motor drive circuit similar to that employed in the motor drive circuit shown and described with reference to FIG. 2 are shown by like reference numerals and characters with respective primes given thereto.

However, in the circuit shown in FIG. 3, for avoiding any possible interference between the motor drive circuits respectively designated by MDC and MDC' in FIG. 3, diodes 28, 29, 28' and 29' are employed. Unless these diodes 28, 29, 28' and 29' are employed, there will arise a possible interference between the motor drive circuits MDC and MDC', for example, when there is a delay in operation between the motors Mo and Mo'. By way of example, where the switch assembly of the construction shown in FIGS. 4(a) to 4(c) is employed for each of the selector switches 23 and 23', there is the possibility that the contact brushes 31, 32 and 33 are still electrically connected to each other through the rotor of the switch assembly in one motor drive circuit MDC even when the contact brush 32 of the switch assembly in the other motor drive circuit MDC', which has been engaged to the contact brush 32 through the rotor is completely switched over to the contact brush 33. In this case, the electric current fed to the relay coil 21 through the switch assembly in the motor drive circuit MDC will also be fed to the relay coil 21' through the switch assembly in the motor drive circuit MDC', resulting in an erroneous operation of the circuit. Accordingly, the use of the diodes 28, 29, 28' and 29' is recommended for avoiding such an interference as described above.

In addition, where an additional auxiliary lamp 18' is employed together with the auxiliary lamp 18, these lamps 18 and 18' may be used as indicator lamps for showing the width of the automobile body in the night.

Although the present invention has fully been described in connection with the preferred embodiments thereof with reference to the accompanying drawings, it is to be noted that various changes and modifications are apparent to those skilled in the art. By way of example, the or each motor Mo and Mo' may be of a reversible type. Moreover, instead of the use of a single motor for driving the cover plate or the headlight between the concealed and exposed positions, separate motors one for driving the cover plate or the headlight from the concealed position towards the exposed position and the other for driving the cover plate or the headlight from the exposed position back towards the concealed position may be employed. In this case of the use of the separate motors, the relay coil 21 and its associated switch 23 and the selector switch 22, so far as the embodiment shown in FIG. 2 is involved, may be omitted and, instead, the separate motors may be electrically connected respectively to the power supply lines which have been described as respectively connected to the fixed contacts 22b and 22c. However, in this possible circuit arrangement wherein the separate motors are employed, additional switch means are required for alternately bringing these separate motors into operation, as can readily be understood by those skilled in the art.

In addition, the use of the auxiliary lamp 18 is not always essential and, therefore, each of the switches 17 and 20 may be of a type having at least two switching positions.

Furthermore, although the present invention has been described as applied to the retractable type wherein the lamp housing 12 is supported by the pivotally supported cover plate 13, the concept of the present invention can equally be applicable not only to the cover-up type, but also to another form of the retractable type wherein the lamp housing is pivotally supported at its front so that, when the lamp housing is concealed, the lamp housing can be held in the lamp room with the lamp element therein substantially facing the sky.

Accordingly, such changes and modifications are to be understood as included within the true scope of the present invention unless they depart therefrom.

I claim:

1. In an automobile concealable headlight apparatus comprising at least one light unit including at least one lamp element and a concealing means operable to selectively conceal and expose the light unit, the improvement comprising:
   a manually operable light switch means operatively connected electrically to said concealing means for providing electrical power to operate said concealing means to selectively conceal and expose the light unit and providing power to said at least one lamp element to illuminate said lamp element;
   an additional manually operable switch means operatively connected electrically to said concealing means to selectively conceal and expose the light unit;
   wherein the operation of said additional switch to expose the light unit is independent of the operation of said light switch.

2. An automobile concealable headlight lighting apparatus which comprises, in combination:
   at least one light unit including at least one lamp element;
   a concealing means operable to selectively conceal and expose the light unit;
   a light switch means having at least first and second switching positions wherein said light switch means completes and opens a first power supply circuit between a common source of electric power and said lamp element, respectively;
   a drive unit for operating said concealing means when fed with electric power from the common electric power source;
   a first switch means operatively associated with said light switch means such that, when said light switch means is in said first switching position, said first switch means is held in position to complete a second power supply circuit between the common electric power source and the drive unit and, when said light switch means is in said second switching position, said first switch means is held in position to open said second power supply circuit and to complete a third power supply circuit between the common electric power source and the drive unit;
   a second switch means operable to selectively complete and open a fourth power supply circuit between the common electric power source and the drive unit;
   a third switch means inserted in said third power supply circuit for selectively allowing and interrupting the supply of an electric power from the common electric power source to the drive unit, said third switch means being so operatively associated with said second switch means that, when said second switch means is in position to complete the fourth power supply circuit, said third switch means is held in position to interrupt the supply of the electric power through the third power supply circuit and, when said second switch means is in position to open the fourth power supply circuit, said third switch means is held in position to allow the supply of the electric power through the third power supply circuit; and
   a selector switch means having a movable contact member, electrically connected to the drive unit, and first and second fixed contact members, said movable contact member being selectively engageable to the first fixed contact member when said light unit is held in the concealed position and to the second fixed contact member when the light unit is held in the exposed position, said first and second fixed contact members being electrically connected respectively to the second and fourth power supply circuits and to the third power supply circuit.

3. An apparatus as claimed in claim 2, wherein said concealing means comprises:
   a light chamber defined in a vehicle body, said light unit being rigidly coupled to the vehicle body and positioned within the light chamber;
   a cover means supported for movement between closed and opened positions wherein the light unit within the light chamber is concealed and exposed, respectively, relative to the light chamber; and
   a linkage mechanism, said drive unit operatively coupled to the cover means through said linkage mechanism.

4. An apparatus as claimed in claim 3, wherein said drive unit includes an electric motor and a reduction gear unit having an output shaft operatively coupled to the cover means through the linkage mechanism, a relay coil connected in series with the movable contact member of the selector switch means, and a relay switch connected between the electric motor and the common electric power source for allowing the supply of the electric power from the common electric power source to the electric motor only when the relay coil is energized by the electric power fed through the selector switch means, said output shaft of the reduction gear unit being rotatable at a reduced speed as compared with the speed of rotation of the motor, said motor undergoing a first half of one complete rotation thereof for moving the cover means from the closed position towards the opened position when the relay coil is energized by the electric power fed through the selector switch means by way of any one of the second and fourth power supply circuits, said motor further undergoing the latter half of the one complete rotation thereof for moving the cover means from the opened position towards the closed position when the relay coil is energized by the electric power fed through the selector switch means by way of the third power supply circuit.

5. An apparatus as claimed in claim 4, wherein the movable contact member of the selector switch means is engaged to the first fixed contact member in response to the arrival of the cover means at the closed position and to the second fixed contact member in response to the arrival of the cover means at the opened position, and wherein said selector switch means comprises a rotor made of an electroconductive material and mounted on the output shaft for rotation together therewith, and first, second and third elastic contact brushes urged to contact one end face of said rotor, said rotor having first and second electrically non-conductive area spaced substantially 180° from each other about the axis of rotation of said rotor, said rotor and said first contact brush forming the movable contact member of the selector switch means while said second and third contact brushes form the respective first and second fixed contact members of the selector switch means, said rotor and said first, second and third contact brushes being so arranged that, when the cover means is in the closed position, the first and second contact brushes are electrically connected to each other through the rotor while the third contact brush is engaged in the first non-conductive area of the rotor and, when the cover means is in the opened position, the first and third contact brushes are electrically connected to each other through the rotor while the second contact brush is engaged in the second non-conductive area of the rotor.

6. An apparatus as claimed in claim 2, wherein said concealing means comprises a light chamber defined in a vehicle body for accommodating therein the light unit and a linkage mechanism, and wherein said light unit is pivotally supported by the vehicle body for movement between concealed and exposed positions wherein said light unit is accommodated within the lamp room and exposed out of the light chamber, respectively, and said drive unit being operatively coupled to the light unit through said linkage mechanism.

7. An apparatus as claimed in claim 2, wherein said drive unit includes an electric motor means operatively coupled to the light unit through said linkage mechanism, a relay coil connected in series with the movable contact member of the selector switch means, and a relay switch connected between the motor means and the common electric power source for allowing the supply of the electric power from the common electric power source to the motor means only when the relay coil is energized by the electric power fed through the selector switch means.

8. An apparatus as claimed in claim 7, wherein said electric motor means includes an electric motor and a reduction gear unit having an output shaft operatively coupled to the cover means, said output shaft of said reduction gear unit being rotatable at a reduced speed with respect to the speed of rotation of said motor, said motor undergoing a first half of one complete rotation thereof for moving the light unit from the concealed position towards the exposed position when the relay coil is energized by the electric power fed through the selector switch means by way of any one of the second and fourth power supply circuits, said motor further undergoing the latter half of the one complete rotation thereof for moving the light unit from the exposed position towards the concealed position when the relay coil is energized by the electric power fed through the selector switch means by way of the third power supply circuit.

9. An apparatus as claimed in claim 8, wherein the movable contact member of said selector switch means is engaged to the first fixed contact member in response to the arrival of the light unit at the concealed position and to the second fixed contact member in response to the arrival of the light unit at the exposed position.

10. An apparatus as claimed in claim 9, wherein said selector switch means comprises a rotor made of an electroconductive material and mounted on the output shaft for rotation together therewith, and first, second and third elastic contact brushes urged to contact one end face of said rotor, said rotor having first and second electrically non-conductive area spaced substantially 180° from each other about the axis of rotation of said rotor, said rotor and said first contact brush forming the movable contact member of the selector switch means while said second and third contact brushes form the respective first and second fixed contact members of the selector switch means, said rotor and said first, second and third contact brushes being so arranged that, when the light unit is in the concealed position, the first and second contact brushes are electrically connected to each other through the rotor while the third contact brush is engaged in the first non-conductive area of the rotor and, when the light unit is in the exposed position, the first and third contact brushes are electrically connected to each other through the rotor while the second contact brush is engaged in the second non-conductive area of the rotor.

* * * * *